(12) United States Patent
Williams et al.

(10) Patent No.: US 9,120,226 B2
(45) Date of Patent: Sep. 1, 2015

(54) SYSTEM AND METHOD FOR REMOTELY POSITIONING AN END EFFECTOR

(71) Applicants: Christopher Williams, New Castle (GB); Dan Dailey, Cleveland, OH (US); Andrew Oxford, Ladson, SC (US); Yogesh Savalia, Vadodara (IN); Bryan White, Ladson, SC (US)

(72) Inventors: Christopher Williams, New Castle (GB); Dan Dailey, Cleveland, OH (US); Andrew Oxford, Ladson, SC (US); Yogesh Savalia, Vadodara (IN); Bryan White, Ladson, SC (US)

(73) Assignee: Lincoln Global, Inc., City of Industry, CA (US)

( * ) Notice: Subject to any disclaimer, the term of this patent is extended or adjusted under 35 U.S.C. 154(b) by 10 days.

(21) Appl. No.: 14/055,070

(22) Filed: Oct. 16, 2013

(65) Prior Publication Data

US 2014/0114478 A1    Apr. 24, 2014

Related U.S. Application Data

(60) Provisional application No. 61/717,380, filed on Oct. 23, 2012.

(51) Int. Cl.
*B25J 9/16*       (2006.01)
*G05B 19/409*    (2006.01)

(52) U.S. Cl.
CPC .............. *B25J 9/1628* (2013.01); *B25J 9/1656* (2013.01); *G05B 19/409* (2013.01); *G05B 2219/36159* (2013.01); *G05B 2219/37388* (2013.01)

(58) Field of Classification Search
CPC .... B25J 9/1628; B25J 9/1656; G01P 15/0888
USPC ............ 700/83–85, 159, 160, 168, 186, 188, 700/192, 193, 257, 264, 180, 253; 318/567, 318/568.12, 568.13, 568.16, 568.19, 318/568.21, 568.25
See application file for complete search history.

(56) References Cited

U.S. PATENT DOCUMENTS 5,657,429 A * 8/1997 Wang et al. ................... 700/251
6,019,554 A   2/2000 Hong
(Continued)

FOREIGN PATENT DOCUMENTS

EP    1795315 A    6/2007
EP    2055446 A1   6/2009

OTHER PUBLICATIONS

Rahul Sekhar et al: "Inertial sensor based wireless control of a robotic arm" Emerging Signal Processing Applications (ESPA) • 2012 IEEE International Conference on. IEEE. Jan. 12, 2012. pp. 87-90. XP032116203. DOI: 10.1109/ESPA.2012.6152452 ISBN: 978-10-4673-8899-1.

(Continued)

*Primary Examiner* — Dalena Tran
(74) *Attorney, Agent, or Firm* — Dority & Manning, P.A.

(57) ABSTRACT

A system for remotely positioning an end effector includes a sensor in an input device aligned with an axis to generate a signal reflective of an angular displacement of the sensor about the axis. A processor receives the signal and executes a set of logic stored in a memory to filter the signal, smooth the signal, and generate a control signal to the end effector that is proportional to the angular displacement of the sensor about the axis. A method for remotely positioning an end effector includes moving an input device, sensing an angular displacement of a sensor from an axis, generating a signal reflective of the angular displacement of the sensor about the axis, smoothing the signal, and generating a control signal to the end effector that is proportional to the angular displacement of the sensor about the axis.

20 Claims, 6 Drawing Sheets

(56) References Cited

U.S. PATENT DOCUMENTS

| | | | |
|---|---|---|---|
| 6,184,868 | B1 | 2/2001 | Shahoian et al. |
| 6,941,248 | B2 | 9/2005 | Friedrich et al. |
| 7,074,179 | B2 * | 7/2006 | Wang et al. .................. 600/101 |
| 7,437,211 | B1 | 10/2008 | Haas et al. |
| 7,990,365 | B2 | 8/2011 | Marvit et al. |
| 8,040,328 | B2 | 10/2011 | Smith et al. |
| 2006/0061545 | A1 | 3/2006 | Hughes et al. |
| 2008/0048980 | A1 | 2/2008 | Love et al. |
| 2009/0241052 | A1 | 9/2009 | Ha et al. |
| 2010/0009308 | A1 | 1/2010 | Wen et al. |
| 2010/0108654 | A1 | 5/2010 | Ulrich et al. |
| 2010/0150399 | A1 | 6/2010 | Svajda et al. |
| 2011/0019205 | A1 | 1/2011 | Gerber et al. |
| 2011/0055720 | A1 | 3/2011 | Potter et al. |

OTHER PUBLICATIONS

Zongwei Li et al: "A novel human-robot interaction system based on HMM" Intelligent Control and Automation (WCICA), 2011 9th World Congress on, IEEE, Jun. 6, 2011, pp. 457-461, XP031912124, DOI: 10.1109/WCICA .2011.5970556 ISBN: 978-1-61284-6989 Sections 2.1, 2.3.2, 2.5, 2.6, 3.1; figure 1.

Written Opinion and Search Report for PCT/IB2013/002368, dated May 2, 2014.

High-Level programming and control for industrial robotics: using a hand-held accelerometer-based input devise for gesture and posture recognition; Pedro Neto, J. Norberto Pires, and A. Paulo Moreira; Research Article, Industrial Robot; an International Journal 37/2 (2010), pp. 137-147, www.emeraldinsight.com/0143-991X.htm.

Application of low-cost commercial off-the-shelf (cots) Products in the Development of Human-Robot Interactions: Otter L. Osen, Helge T. Kristiansen, and Webjorn Rekdalsbakken;Proceedings 24$^{th}$ European Conference on Modelling and Stimulation, ISBN 978-0-9564944-05/ISBN: 978-0-9564944-1-2 (CD); www.scs-europe.net=conf=ecms2010=2.

Using Accelerometers to Command a Cleaning Service Robot, Armando Sousa, Luis Paulo Reis, epia2009.web.ua.pt_onlineEdition/288-299.

PCT International Search Report on Patentability for Appl. No. PCT/IB2013/002368 dated May 7, 2015.

* cited by examiner

SYSTEM AND METHOD FOR REMOTELY POSITIONING AN END EFFECTOR

PRIORITY CLAIM

The present application claims priority to U.S. Provisional Application Ser. No. 61/717,380, filed Oct. 23, 2012, and which is incorporated herein by reference for all purposes.

FIELD OF THE INVENTION

The present invention generally involves a system and method for remotely positioning an end effector.

BACKGROUND OF THE INVENTION

Computer numerically controlled (CNC) machines are known in the art for having a high degree of precision and accuracy. A CNC machine may control, for example, a drill, press, lathe, or other machinery during the manufacture and/or finishing of various parts or components having relatively low manufacturing tolerances. Each CNC machine typically requires some form of initial setup to position an end effector prior to operation. This initial positioning of the end effector is traditionally performed using a bespoke control panel having a combination of switches and/or a rotary dials to precisely control manual positioning of the end effector. For example, an operator may select a first axis to move the end effector and press a switch and/or rotate a potentiometer to move the end effector along the selected first axis at the selected speed. The operator may then repeat the process for two or more axes until the operator has satisfactorily positioned the end effector at the desired position. Although eventually effective at positioning the end effector, this iterative process of selecting a particular axis and moving the end effector along the selected axis can be time consuming and labor intensive.

The development of micro electro-mechanical systems has enabled accelerometers and other sensors to be incorporated into more and more readily available products such as smart phones, tablets, and virtual game controls. As a result, a system and method that uses one or more of these readily available products to remotely position an end effector would be useful to reducing the time and labor associated with positioning the end effector.

BRIEF DESCRIPTION OF THE INVENTION

Aspects and advantages of the invention are set forth below in the following description, or may be obvious about the description, or may be learned through practice of the invention.

One embodiment of the present invention is a system for remotely positioning an end effector. The system includes an input device and a first sensor in the input device. The first sensor is aligned with a first axis and configured to generate a first signal reflective of a first angular displacement of the first sensor about the first axis. A processor is in communication with the first sensor such that the processor receives the first signal. The processor is configured to execute a first set of logic stored in a memory that causes the processor to filter the first signal, smooth the first signal, and generate a first control signal to the end effector that is proportional to the first angular displacement of the first sensor about the first axis.

Another embodiment of the present invention is a system for remotely positioning an end effector that includes an input device and an accelerometer in the input device. The accelerometer is configured to generate a first signal reflective of a first angular displacement of the accelerometer from a first axis. A processor is in communication with the accelerometer such that the processor receives the first signal. The processor is configured to execute a first set of logic stored in a memory that causes the processor to smooth the first signal and generate a first control signal to the end effector that is proportional to the first angular displacement of the accelerometer about the first axis.

In yet another embodiment, a method for remotely positioning an end effector includes moving an input device, sensing a first angular displacement of a first sensor about a first axis, and generating a first signal reflective of the first angular displacement of the first sensor about the first axis. The method further includes smoothing the first signal and generating a first control signal to the end effector that is proportional to the first angular displacement of the first sensor about the first axis.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
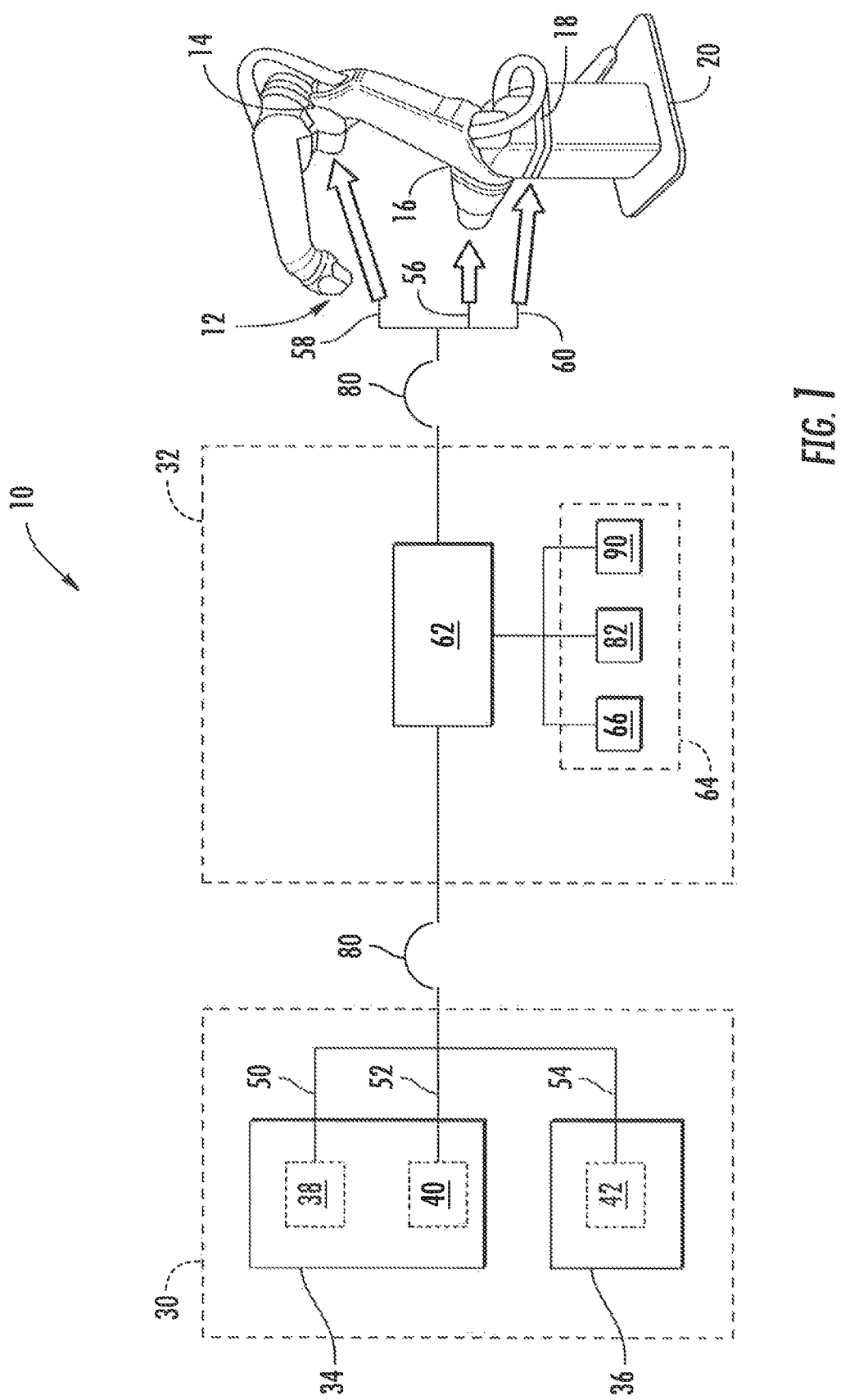
FIG. 1 is an exemplary block diagram of a system for remotely positioning an end effector according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing about the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for remotely positioning an end effector. The system generally includes a smartphone, tablet, virtual game control, or other portable input device having one or more sensors aligned with orthogonal axes. Each sensor may generate a signal reflective of an angular displacement of the sensor about the associated axis, and a processor in communication with the sensors may receive the signals. The processor may be configured to execute logic stored in a memory to filter and/or smooth the signals and to generate a control signal to the end effector that is proportional to the angular displacement of each sensor about the associated axis. In particular embodiments, the system may further include an interlock that prevents remote positioning of the end effector unless the interlock is satisfied. Alternately, or in addition, the system may include additional logic that modifies the processor for different end effectors and/or adjusts the rate of change of the control signal(s) in response to acceleration of the angular displacement of the sensor about the associated axis. Although exemplary embodiments of the present invention will be described in the context of a CNC machine, one of ordinary skill in the art will readily appreciate that embodiments of the present invention may be applied to any end effector, and the present invention is not limited to a CNC machine unless specifically recited in the claims.

FIG. 1 provides an exemplary block diagram of a system 10 for remotely positioning an end effector 12 according to one embodiment of the present invention. The end effector 12 may include any remotely controlled tool used to cut, grind, machine, finish, or otherwise manufacture a component. For example, the end effector 12 may be a knife, a drill, a router head, a laser, a grinding wheel, a flat bed machine that has a conventional XYZ Cartesian configuration, or any other manufacturing device known to one of ordinary skill in the art that can be remotely positioned in one or more directions. The end effector 12 may be operably connected to one or more pivots or joints to allow remote positioning of the end effector 12 along a line, in a plane, or in a volume. In the particular embodiment shown in FIG. 1, for example, first, second, and third joints 14, 16, 18 are arranged orthogonal to one another and connect the end effector 12 to a stand 20. Servo-motors or other actuators (not shown) connected to the joints 14, 16, 18 enable movement of the end effector 12 in three dimensions.

As shown in FIG. 1, the system 10 generally includes an input device 30 and a computing device 32 operably connected to the end effector 12. The input device 30 may be, for example, a smartphone, tablet, virtual game controller, or other commercially available portable device having the one or more sensors that can detect and/or quantify movement of the input device 30 about one or more axes. Although various embodiments of the present invention will be described herein as having multiple separate sensors aligned with orthogonal axes for completeness, in particular embodiments the input device 30 may have a single sensor aligned with one or more axes, and the present invention does not require a separate sensor for each axis unless specifically recited in the claims. In addition, although the input device 30 and computing device 32 are illustrated by separate blocks in FIG. 1, one of ordinary skill in the art will readily appreciate that one may be incorporated into the other. For example, the input device 30 may be a smartphone, and the computing device 32 may be an application loaded and operating in the smartphone.

In the particular embodiment shown in FIG. 1, for example, the input device 30 may be a smartphone that includes an accelerometer sensor 34 and an orientation sensor 36. The accelerometer sensor 34 in turn may include a pitch accelerometer 38 and a roll accelerometer 40, and the orientation sensor 36 may include a compass or yaw accelerometer 42. Each sensor 34, 36 and/or each accelerometer 38, 40, 42 may be aligned with a different orthogonal axis. For example, as shown most clearly in FIG. 2, each sensor 34, 36 and/or each accelerometer 38, 40, 42 (collectively depicted in FIG. 2 as a sphere inside the input device 30) may be aligned with first, second, and third axes 44, 46, 48, respectively. In this manner, each sensor 34, 36 and/or each accelerometer 38, 40, 42 may detect the direction and amount that the input device 30 moves about each respective axis 44, 46, 48.

Returning to the particular embodiment shown in FIG. 1, the pitch accelerometer 38 may be aligned with the first axis 44 and configured to generate a first signal 50 reflective of a first angular displacement of the pitch accelerometer 38 about the first axis 44. Similarly, the roll accelerometer 40 may be aligned with the second axis 46 orthogonal to the first axis 44 and configured to generate a second signal 52 reflective of a second angular displacement of the roll accelerometer 40 about the second axis 46. Lastly, the yaw accelerometer 42 may be aligned with the third axis 48 orthogonal to the first and second axes 44, 46 and configured to generate a third signal 54 reflective of a third angular displacement of the yaw accelerometer 42 about the third axis 48. In this manner, the pitch, roll, and yaw accelerometers 38, 40, 42 may sense motion of the input device 30 in three planes and generate separate signals 50, 52, 54 reflective of the direction and magnitude that the input device 30 has rotated about each axis 44, 46, 48. The information contained in these signals 50, 52, 54 may then be processed by the computing device 32 to map the information into a three-dimensional coordinate system to reposition the end effector 12. Specifically, for each sensor 34, 36 or each accelerometer 38, 40, 42, the sign or direction of the angular displacement may correspond to the direction of the movement about each respective axis 44, 46, 48 in a single plane, and the magnitude of the angular displacement may correspond to the rate or velocity of the movement about each respective axis 44, 46, 48 in a single plane. Collectively, the three signals 50, 52, 54 may thus indicate a desired movement of the end effector 12 in a three-dimensional space.

The computing device 32 is in communication with the input device 30 to receive, manipulate, and map the first, second, and third signals 50, 52, 54 into first, second, and third control signals 56, 58, 60 sent to the end effector 12. In general, the computing device 32 may be any suitable processor-based computing device. For example, suitable computing devices may include personal computers, mobile phones (including smart phones), personal digital assistants, tablets, laptops, desktops, workstations, game consoles, servers, other computers and/or any other suitable computing devices. As shown in FIG. 1, the computing device 32 may include one or more processors 62 and associated memory 64. The processor(s) 62 may generally be any suitable processing device(s) known in the art. Similarly, the memory 64 may generally be any suitable computer-readable medium or media, including, but not limited to, RAM, ROM, hard drives, flash drives, or other memory devices. As is generally understood, the memory 64 may be configured to store information accessible by the processor(s) 62, including instructions or logic that can be executed by the processor(s) 62. The instructions or logic may be any set of instructions that when executed by the processor(s) 62 cause the processor(s) 62 to provide the desired functionality. For instance, the instructions or logic can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

The computing device 32 may also include a network interface tier accessing information over a network. The network interface may include, for example, a USB, Wi-Fi, Bluetooth, Ethernet, or Serial interface. The network may include a combination of networks, such as cellular network, WiFi network, LAN, WAN, the Internet, and/or other suitable network and can include any number of wired or wireless communication links. Information may be exchanged through the network interface using secure data packets that is automatically validated to ensure its integrity between devices.

As shown in FIG. 1, the processor 62 is in communication with the pitch, roll, and/or yaw accelerometers 38, 40, 42 such that the processor 62 receives the first, second, and/or third signals 50, 52, 54. The processor 62 is configured to execute a first set of logic 66 stored in the memory 64 to normalize, filter, and/or smooth the first, second, and/or third signals 50, 52, 54. In addition, the first set of logic 66 may enable the processor 32 to generate the first, second, and/or third control signals 56, 58, 60 to the end effector 12 that are proportional to the first, second, and third signals 50, 52, 54, respectively.

Figure 3:
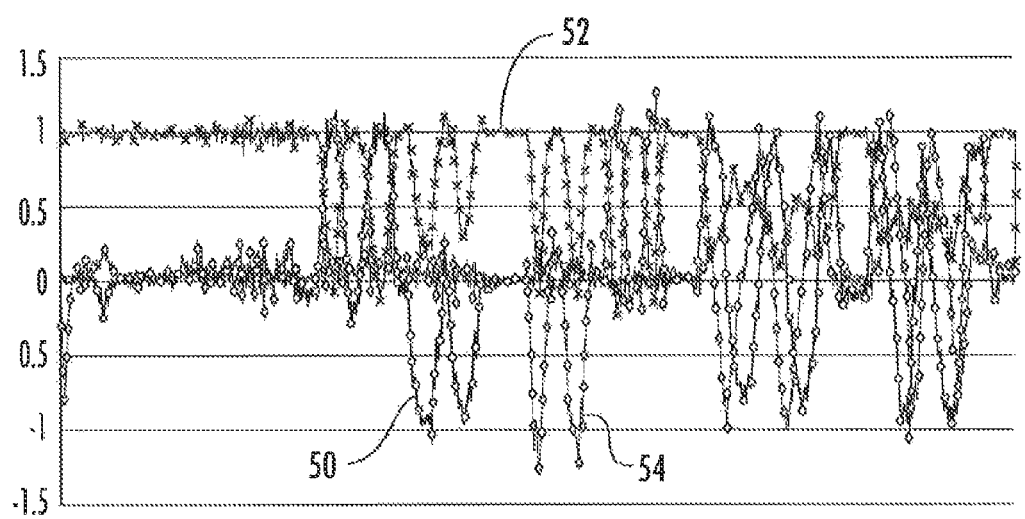
FIG. 3 is an exemplary graph of raw signals reflective of an angular displacement of a sensor about three axes.
Figure 4:
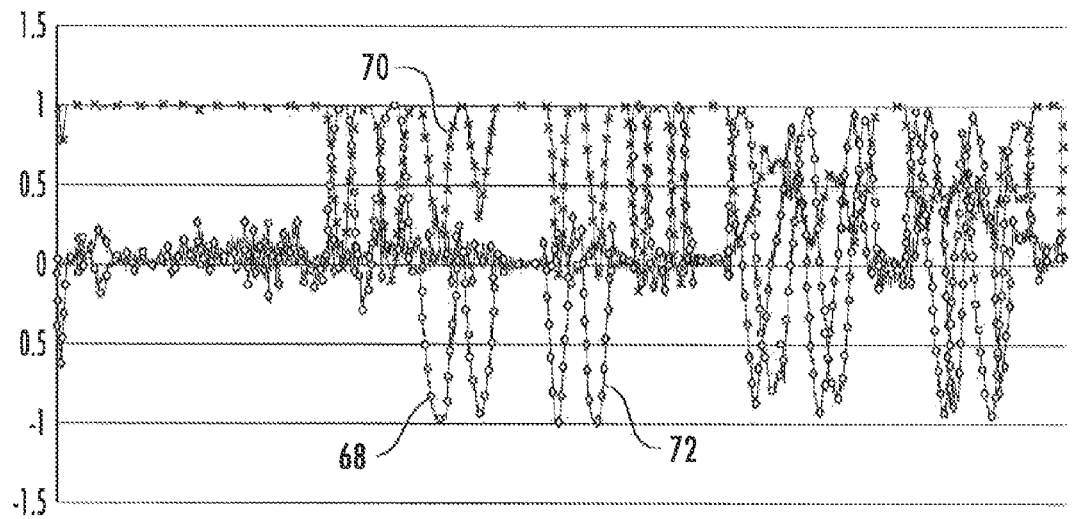
FIG. 4 is an exemplary graph of the raw signals shown in FIG. 3 normalized.
Figure 5:
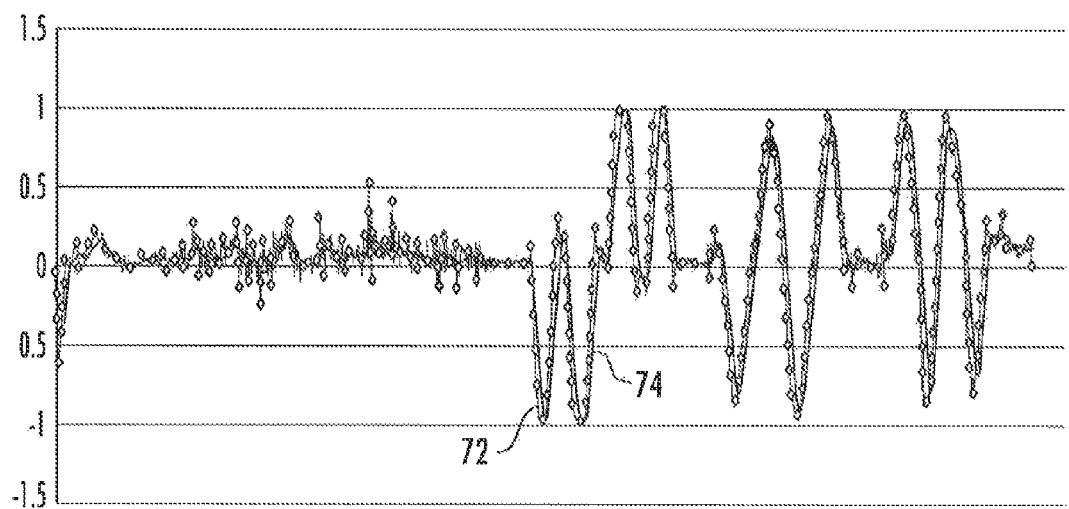
FIG. 5 is an exemplary graph of the normalized third signal shown in FIG. 4 with an overlay of the same signal filtered and smoothed.

FIGS. 3-5 provide exemplary graphs of the signals 50, 52, 54 during various stages of manipulation by the processor 62. Specifically, FIG. 3 provides an exemplary graph of the first, second, and third signals 50, 52, 54 generated by the respective pitch, roll, and yaw accelerometers 38, 40, 42. As shown in FIG. 3, the raw data from the accelerometer and orientation sensors 34, 36 may include substantial noise caused by electromagnetic interference or simply the high sensitivity of the associated pitch, roll, and yaw accelerometers 38, 40, 42. In addition, different input devices 30 may superimpose varying degrees of noise or jitter signal into the raw signals. If the raw signals 50, 52, 54 shown in FIG. 3 were not modified, the end effector 12 would be subjected to fast transients, resulting in unnecessary vibrations that would make it difficult to precisely and accurately position the end effector 12. In addition, the unnecessary vibrations would increase the normal wear associated with moving parts and compromise the useful life of the system 10.

The first set of logic 66 may enable the processor 62 to normalize the raw signals 50, 52, 54 to reduce the noise in the signals, as shown in FIG. 4. The normalized signals 68, 70, 72 shown in FIG. 4 convert the raw data from its native range to a range that fits all three inputs, allowing further comparative analysis of the normalized signals 68, 70, 72 without requiring individual scales for each plane of motion. The normalized signals 68, 70, 72 may then be filtered to remove the fast transients and noisy components within the signals to provide a smoother profile.

FIG. 5 provides an exemplary graph of the normalized third signal 72 as shown in FIG. 4 with an overlay 74 of the same signal filtered and smoothed by the processor 62 executing the first set of logic 66. The first set of logic 66 may include, for example, a transfer function to filter the raw data included in the normalized third signal 72 to remove the fast transients. The following transfer function is one such model that may be included in the first set of logic 66 for filtering the raw data included in the normalized signals 68, 70, 72:

$$H(j\omega) = \frac{1}{\sqrt{1+\varepsilon^2\left(\frac{\omega}{\omega_p}\right)^{2o}}};$$

where o defines the filter order; ω is equal to 2Πf, where f is the cut off frequency; and ε is the maximum pass band filter gain. The first set of logic 66 may further include a polynomial splining algorithm to smooth the filtered signal and produce a perturbation free signal. For example, the following general degree a polynomial may be applied to smooth each normalized and filtered signal:

$$P_{(n)}(x) = a_n x^n + a_{n-1} x^{n-1} + \ldots + a_1 x + a_0$$

The resulting overlay 74 shown in FIG. 5 thus shows the normalized third signal 72 after having been filtered by the transfer function to remove the high frequency noise and fast transients and smoothed by the high order polynomial spline to produce an acceptable profile that can be accurately interpreted to create the third control signal 60 to move the end effector 12.

Figure 6:
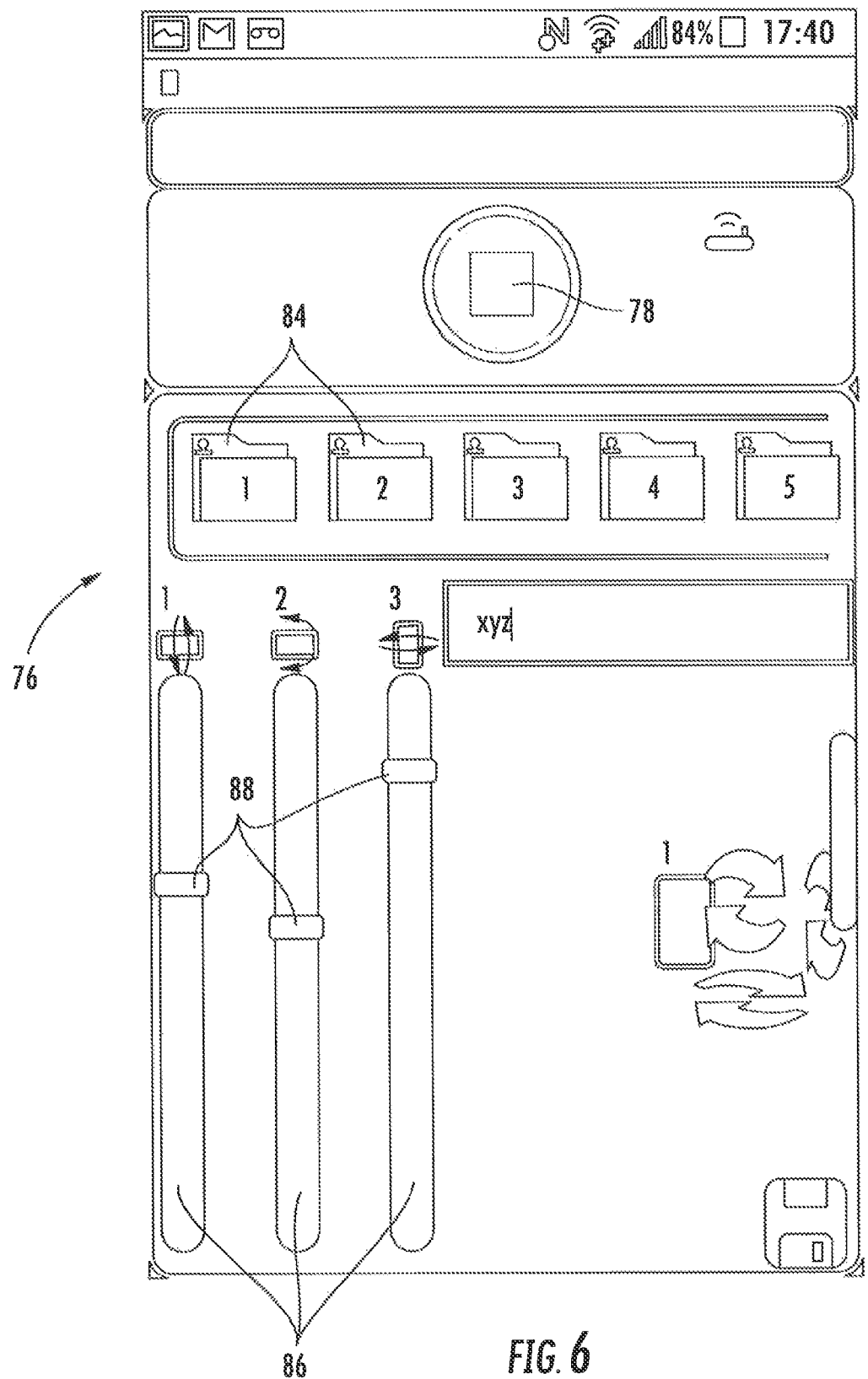
FIG. 6 is an exemplary display of a human machine interface.

FIG. 6 provides an exemplary display 76 for a human machine interface, also known as a graphic user interface, according to various embodiments of the present invention. The display 76 may be incorporated into the input device 30 and/or the computing device 32 for ready access by a user. As shown in FIG. 6, the user interface may include one or more safety features to protect against accidental end effector 12 movement caused by inadvertent input device 30 movement. For example, the user interface may include an interlock 78 in the form of a hard or soft button that must be depressed or toggled to enable movement of the end effector 12 in one or more directions. In particular embodiments, for example, the interlock 78 may control one or more relay contacts 80 that prevent the first, second, and/or third signals 50, 52, 54 from reaching the computing device 32, as shown in FIG. 1. Alternately or in addition, the relay contacts 80 may prevent the first, second, and/or third control signals 56, 58, 60 from reaching the end effector 12, as additionally shown in FIG. 1. In this manner, the input device 30 may not cause the end effector 12 to move in a particular direction unless the interlock 78 is first satisfied.

Various embodiments of the present invention may also include any combination of hardwired and/or programmable logic to facilitate connecting the system 10 to different end effectors 12. Referring to FIGS. 1 and 6 in combination, for example, the computing system 32 may further include a second set of logic 82 stored in the memory 64 that may be executed by the processor 62 to modify the first set of logic 66 for different end effectors 12. In conjunction with this, the display 76 may include a separate jog profile 84 for each different end effector 12, and selection of a particular jog profile 84 shown on the display 76 may cause the processor 62 to execute the second set of logic 82 to modify the first set of logic 66. In this manner, the same input device 30 may be used for multiple different end effectors 12 having different directions of motion, ranges of motion, sensitivity to motion, acceleration limits or needs, and/or other specific features particular or unique to each end effector 12.

To illustrate this functionality, one particular end effector 12 may be a drill capable of initial positioning in a single plane. Selection of the jog profile 84 associated with the drill may thus cause the second set of logic 82 to modify the first set of logic 66 to null or inhibit any signal that might cause the drill to move outside of the single plane during initial positioning. As another illustration, a particular end effector 12 may be a laser capable of movement in three dimensions, but having different maximum permissible velocities in each dimension. Selection of the jog profile 84 associated with the laser may display a separate velocity scale 86 for each axis on the display 76, as shown in FIG. 6. A sliding control 88 may allow the user to adjust the maximum permissible velocity for each axis, as desired. For particular jog profiles, the adjustment of the maximum permissible velocity for each axis allows the user to adjust the control resolution of velocity for each axis because the full scale velocity may be interpolated between zero and the maximum velocity set by the sliding controls 88. The user interface may communicate the maximum permissible velocity adjustment for each axis to the second set of logic 82, and the second set of logic 82 may in turn cause the processor 62 to modify the first set of logic 66 accordingly. In yet another illustration of the functionality of the second set of logic 82, each jog profile 84 may map a particular sensor 34, 36 and/or accelerometer 38, 40, 42 to a particular axis of movement for the end effector 12. Using the user interface shown in FIG. 6, the user may change the mapping between sensors 34, 36 and axes or between accelerometers 38, 40, 42 and axes, as desired to suit the particular user's preferences, and the second set of logic 82 may effect this change in mapping by modifying the first set of logic 66 accordingly.

Figure 7:
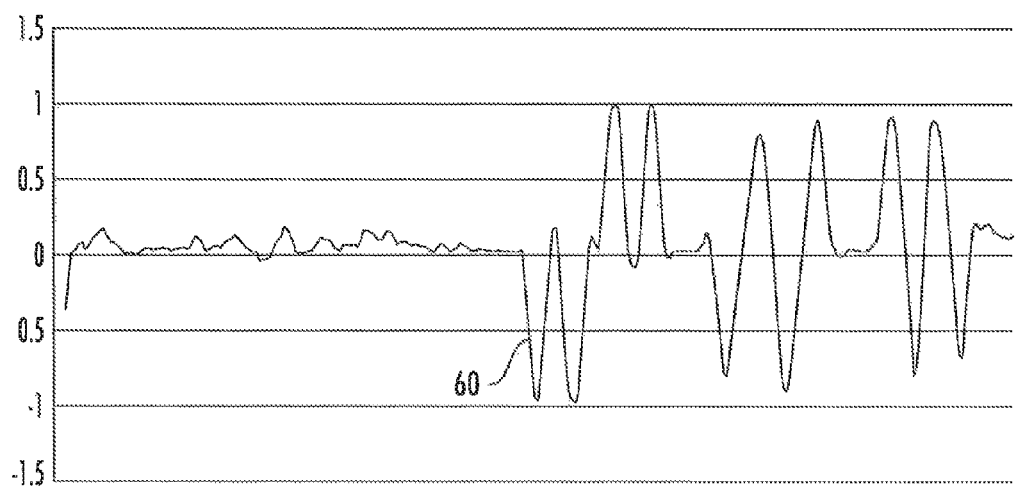
FIG. 7 is an exemplary graph of a control signal generated from the third signal.

Once the raw signals 50, 52., 54 have been normalized, filtered, and/or smoothed, as described and illustrated with respect to FIGS. 3-5, and the user has selected the desired jog profile 84, as described and illustrated with respect to FIGS. 1 and 6, the processor 62 may execute the first set of logic 66 to generate the first, second, and/or third control signals 56, 58, 60 to the end effector 12 that are proportional to the first, second, and/or third angular displacements of the sensors 34, 36 and/or accelerometers 38, 40, 42 about the respective axes. FIG. 7 provides an exemplary graph of the third control signal 60 communicated to the end effector 12 to reposition the end effector about the third axis 48. If the third control signal 60 is the only control signal that reaches the end effector 12, then the end effector 12 will only rotate about the third axis 48; otherwise, the end effector 12 will simultaneously move in response to each control signal 56, 58, 60 to effect simultaneous movement of the end effector 12 in three dimensions.

Figure 8:
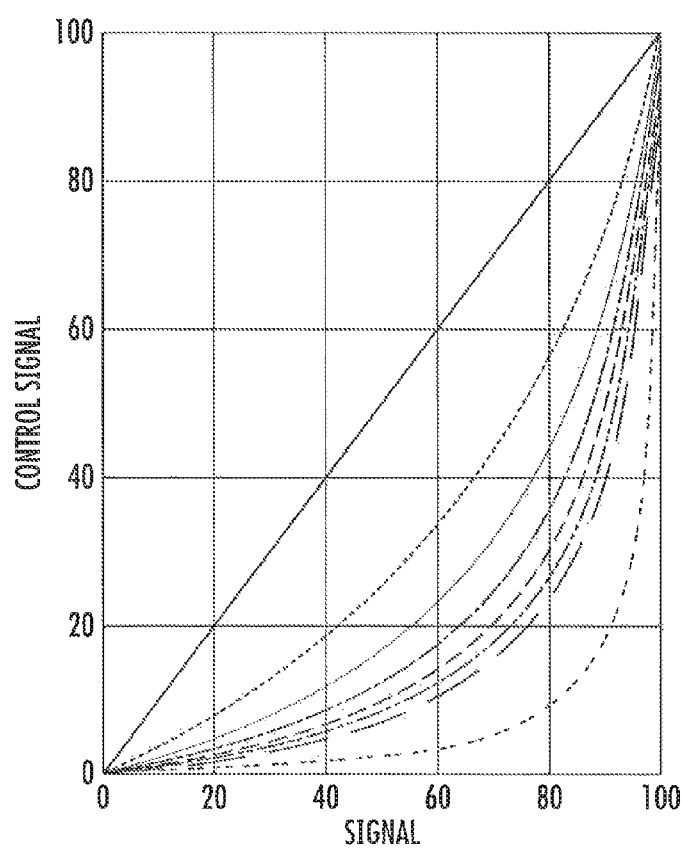
FIG. 8 is an exemplary graph of an acceleration profile that may be incorporated into the system shown in FIG. 1.

Various embodiments of the present invention may also include any combination of hardwired and/or programmable logic to facilitate adjusting the sensitivity or acceleration of the end effector 12 to movement by the input device 30. Referring to FIGS. 1 and 8 in combination, for example, the computing system 32 may further include a third set of logic 90 stored in the memory 64 that may be executed by the processor 62 to modify the scale of the first, second, and/or third control signals 56, 58, 60 in response to the first, second, and/or third signals 50, 52, 54. As previously described with respect to FIG. 6, the display 76 may include a separate jog profile 84 for each different end effector 12, and selection of a particular, jog profile 84 shown on the display 76 may display a separate acceleration scale for each axis on the display 76, with a sliding control that allows the user to adjust the maximum permissible acceleration for each axis, as desired. For particular jog profiles, the adjustment of the maximum permissible acceleration for each axis allows the user to adjust the control resolution of acceleration for each axis because the full scale acceleration may be interpolated between zero and the maximum acceleration set by the sliding controls. The user interface may communicate the adjustment to the maximum permissible acceleration for each axis to the third set of logic 90, and the third set of logic 90 may in turn cause the processor 62 to modify the first set of logic 66 accordingly. In this manner, the third set of logic 90 stored in the memory 64 may adjust the rate of change of the first, second, and/or third control signals 56, 58, 60 in response to a rate of change of the first, second, and/or third signals 50, 52, 54, as shown in the exemplary graph provided in FIG. 8.

Figure 2:
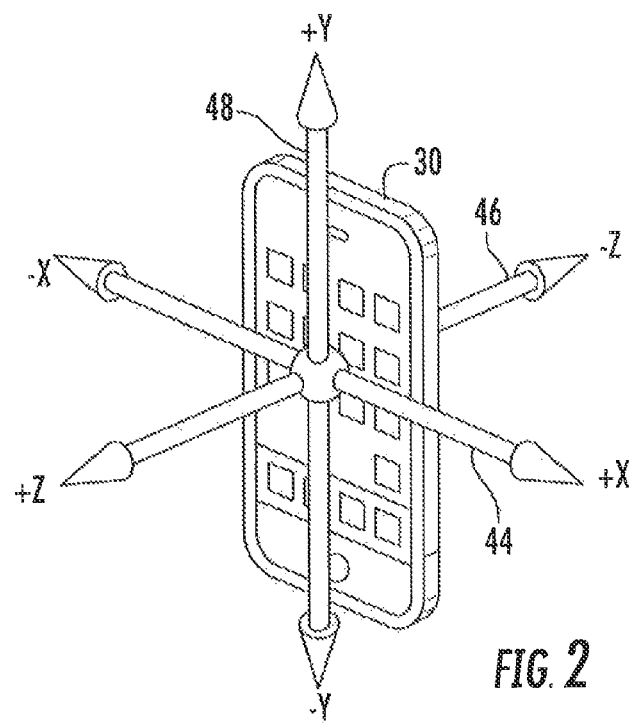
FIG. 2 is an exemplary input device aligned with first, second, and third axes.
Figure 9:
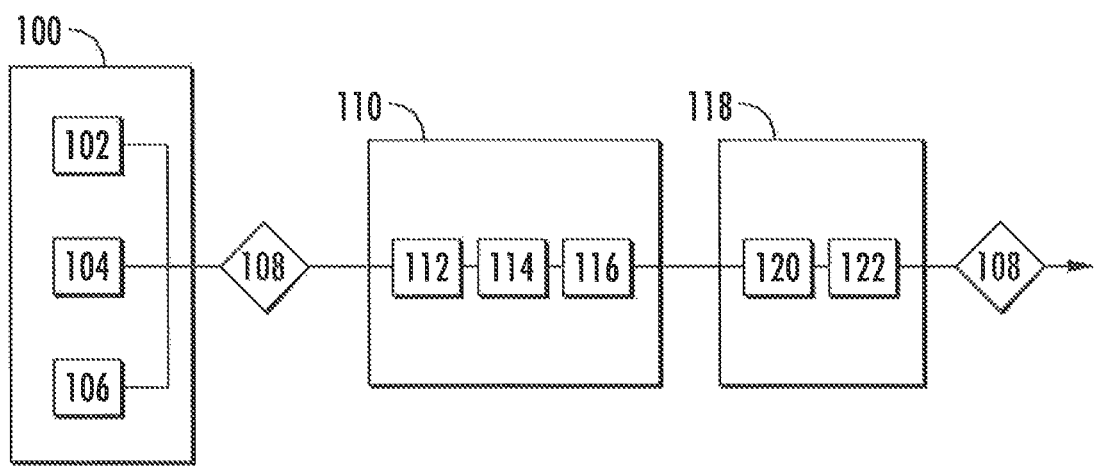
FIG. 9 is a block diagram of an algorithm for a method for remotely positioning an end effector according to one embodiment of the present invention.

The embodiments shown and described with respect to FIGS. 1-8 may thus provide a method for remotely positioning the end effector 12, and FIG. 9 provides a block diagram of a suitable algorithm according to one embodiment of the present invention. The method may include moving the input device 30 about one or more axes 44, 46, 48, as shown in FIG. 2 and represented by block 100 in FIG. 9. The method further includes detecting or sensing the angular displacement of the input device 30 about the one or more axes 44, 46, 48 and generating the signals 50, 52, 54 reflective of the angular displacement of the sensors 34, 36 and/or accelerometers 38, 40, 42 about the respective axes 44, 46, 48, as represented by blocks 102, 104, and 106. At block 108, the method may include preventing the end effector 12 from moving unless the interlock 78 is satisfied. As previously discussed with respect to FIGS. 1 and 6, this may be accomplished, for example, by interrupting communication of the first, second, and/or third signals 50, 52, 54 to the computing system 32 and/or interrupting communication of the first, second, and/or third control signals 56, 58, 60 to the end effector 12.

Block 110 represents manipulating the raw signals 50, 52, 54. The data manipulation may include, for example, normalizing 112, filtering 114, and/or smoothing 116 the raw signals 50, 52, 54, as previously discussed with respect to FIGS. 3-5. At block 118, the method generates the first, second, and/or third control signals 56, 58, 60 to the end effector 12 that are proportional to the angular displacement of the input device 30 about the respective axes 44, 46, 48. In particular embodiments, generating the control signals 56, 58, 60 may include, for example, mapping one or more of the control signals 56, 58, 60 for different end effectors 12 by selecting the jog profile 84 associated with each particular end effector 12, represented by block 120. Alternately or in addition, generating the control signals 56, 58, 60 may include adjusting a rate of change of one or more of the control signals 56, 58, 60 in response to a rate of change of the corresponding first, second, and/or third signals 50, 52, 54, as shown and described with respect to FIGS. 1 and 8 and indicated by block 122.

It is believed that the various embodiments described herein with respect to FIGS. 1-9 may provide one or more advantages over existing technology. For example, the system 10 and method described and illustrated herein may enhance precise initial positioning of the end effector 12 in one or more planes. In addition, the initial positioning may be performed simultaneously in each plane, through intuitive manipulation of a commonly available, off-the-shelf input device 30, and without requiring more time consuming and labor intensive iterative manipulation of multiple buttons and/or wheels for each axis of directed movement. Lastly, in particular embodiments, the system 10 may be easily and conveniently adjusted or tailored for use with different end effectors 12 selected by the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ about the literal language of the claims, or if they include equivalent structural elements with insubstantial differences about the literal language of the claims.

What is claimed is:

1. A system for remotely positioning an end effector, comprising:
   a. an input device;
   b. a first sensor in the input device, wherein the first sensor is aligned with a first axis and configured to generate a first signal reflective of a first angular displacement of the first sensor about the first axis; and
   c. a processor in communication with the first sensor such that the processor receives the first signal, wherein the processor is configured to execute a first set of logic stored in a memory that causes the processor to filter the first signal, smooth the first signal, and generate a first control signal to move the end effector in a first direction and at a first rate that is proportional to the first angular displacement of the first sensor about the first axis.

2. The system as in claim 1, further comprising a second sensor in the input device, wherein the second sensor is aligned with a second axis orthogonal to the first axis and configured to generate a second signal reflective of a second angular displacement of the second sensor about the second axis; and the processor in communication with the second sensor such that the processor receives the second signal, wherein the processor is configured to execute the first set of logic stored in the memory that causes the processor to filter the second signal, smooth the second signal, and generate a second control signal to move the end effector in a second direction and at a second rate that is proportional to the second angular displacement of the second sensor about the second axis.

3. The system as in claim 2, further comprising a third sensor in the input device, wherein the third sensor is aligned with a third axis orthogonal to the first and second axes and configured to generate a third signal reflective of a third angular displacement of the third sensor about the third axis; and the processor in communication with the third sensor such that the processor receives the third signal, wherein the processor is configured to execute the first set of logic stored in the memory that causes the processor to filter the third signal, smooth the third signal, and generate a third control signal to move the end effector in a third direction and at a third rate that is proportional to the third angular displacement of the third sensor about the third axis.

4. The system as in claim 3, wherein the processor is configured to execute the first set of logic stored in the memory to normalize the first, second, and third signals.

5. The system as in claim 1, further comprising an interlock having a first position that prevents the end effector from responding to the first control signal.

6. The system as in claim 1, wherein the processor is configured to execute a second set of logic stored in the memory to modify the first set of logic for different end effectors.

7. The system as in claim 1, wherein the processor is configured to execute a third set of logic stored in the memory to adjust a rate of change of the first control signal in response to a rate of change of the first signal.

8. A system for remotely positioning an end effector, comprising:
   a. an input device;
   b. an accelerometer in the input device, wherein the accelerometer is configured to generate a first signal reflective of a first angular displacement of the accelerometer from a first axis; and
   c. a processor in communication with the accelerometer such that the processor receives the first signal, the processor configured to execute a first set of logic stored in a memory that causes the processor to smooth the first signal and generate a first control signal to move the end effector in a first direction and at a first rate that is proportional to the first angular displacement of the accelerometer about the first axis.

9. The system as in claim 8, wherein the accelerometer is configured to generate a second signal reflective of a second angular displacement of the accelerometer from a second axis orthogonal to the first axis; and the processor in communication with the accelerometer such that the processor receives the second signal, the processor configured to execute the first set of logic stored in the memory to smooth the second signal and generate a second control signal to move the end effector in a second direction and at a second rate that is proportional to the second angular displacement of the accelerometer about the second axis.

10. The system as in claim 9, wherein the accelerometer is configured to generate a third signal reflective of a third angular displacement of the accelerometer from a third axis orthogonal to the first and second axes; and the processor in communication with the accelerometer such that the processor receives the third signal, the processor configured to execute the first set of logic stored in the memory to smooth the third signal and generate a third control signal to move the end effector in a third direction and at a third rate that is proportional to the third angular displacement of the accelerometer about the third axis.

11. The system as in claim 10, wherein the processor is configured to execute the first set of logic stored in the memory to normalize the first, second, and third signals.

12. The system as in claim 8, further comprising an interlock having a first position that prevents the end effector from responding to the first control signal.

13. The system as in claim 8, wherein the processor is configured to execute a second set of logic stored in the memory to modify the first set of logic for different end effectors.

14. The system as in claim 8, wherein the processor is configured to execute a third set of logic stored in the memory to adjust a rate of change of the first control signal in response to a rate of change of the first signal.

15. A method for remotely positioning an end effector, comprising:
   a. moving an input device;
   b. sensing a first angular displacement of a first sensor about a first axis;
   c. generating a first signal reflective of the first angular displacement of the first sensor about the first axis;
   d. smoothing the first signal; and
   e. generating a first control signal to move the end effector in a first direction and at a first rate that is proportional to the first angular displacement of the first sensor device about the first axis.

16. The method as in claim 15, further comprising sensing a second angular displacement of a second sensor about a second axis orthogonal to the first axis; generating a second signal reflective of the second angular displacement of the second sensor about the second axis; smoothing the second signal; and generating a second control signal to move the end effector in a second direction and at a second rate that is proportional to the second angular displacement of the second sensor about the second axis.

17. The method as in claim 16, further comprising sensing a third angular displacement of a third sensor about a third axis orthogonal to the first and second axes; generating a third signal reflective of the third angular displacement of the third sensor about the third axis; smoothing the third signal; and generating a third control signal to move the end effector in a third direction and at a third rate that is proportional to the third angular displacement of the third sensor device about the third axis.

18. The method as in claim 15, further comprising preventing the end effector from moving unless an interlock is satisfied.

19. The method as in claim 15, further comprising mapping the first control signal for different end effectors.

20. The method as in claim 15, further comprising adjusting a rate of change of the first control signal in response to a rate of change of the first signal.

* * * * *